(12) United States Patent
Nakazawa et al.

(10) Patent No.: US 7,591,387 B2
(45) Date of Patent: Sep. 22, 2009

(54) FUEL FILLING PORT STRUCTURE OF A FUEL TANK

(75) Inventors: Takeo Nakazawa, Wako (JP); Hiroshi Unuki, Wako (JP); Katsunori Suzuki, Asaka (JP); Kazuhiro Yamano, Asaka (JP); Koichi Tadokoro, Atsugi (JP)

(73) Assignee: Honda Motor Co., Ltd., Tokyo (JP)

( * ) Notice: Subject to any disclaimer, the term of this patent is extended or adjusted under 35 U.S.C. 154(b) by 138 days.

(21) Appl. No.: 11/741,971

(22) Filed: Apr. 30, 2007

(65) Prior Publication Data

US 2007/0251598 A1    Nov. 1, 2007

(30) Foreign Application Priority Data

Apr. 28, 2006  (JP) .............................. 2006-125887

(51) Int. Cl.
*B65D 47/02*    (2006.01)
*B65B 3/00*    (2006.01)

(52) U.S. Cl. ................. 220/86.2; 141/383; 141/350

(58) Field of Classification Search ................. 123/516; 141/348–350, 383, 382, 59, 363, 301; 220/262–264, 220/86.1, 86.2; 137/588, 590
See application file for complete search history.

(56) References Cited

U.S. PATENT DOCUMENTS 3,911,977 A * 10/1975 Berger .................. 141/348
3,938,564 A * 2/1976 Jones .................... 141/352
4,526,216 A * 7/1985 Lake, Jr. ................ 141/348
5,467,621 A * 11/1995 Gravino ................. 70/171
5,634,505 A * 6/1997 Wong .................... 141/349
5,921,297 A * 7/1999 Kremer et al. ........... 141/383
6,371,175 B1 * 4/2002 Nusbaumer et al. ....... 141/383

FOREIGN PATENT DOCUMENTS

DE           40 39 269 C1       2/1992
DE      10 2004 002 994 B3      9/2005
EP           12 62 355 A1      12/2002

OTHER PUBLICATIONS

Translation of the Search Report of the German Patent and Trademark Office dated Aug. 22, 2007.

* cited by examiner

*Primary Examiner*—Stephen K Cronin
*Assistant Examiner*—J. Page Hufty
(74) *Attorney, Agent, or Firm*—Westerman, Hattori, Daniels & Adrian, LLP.

(57) ABSTRACT

A fuel filling port structure of a fuel tank is provided in which a lid housed in the port structure is biased towards a closed position when a fuel supply nozzle is not inserted, and moved to an open position when the fuel supply nozzle is inserted. Lid locking mechanisms are disposed in the port structure which lock the lid in the closed position or unlock the lid so as to be movable to the open position corresponding to the insertion of the fuel supply nozzle.

4 Claims, 7 Drawing Sheets

FUEL FILLING PORT STRUCTURE OF A FUEL TANK

TECHNICAL FIELD

The present invention relates to a fuel filling port structure of a fuel tank in which a lid housed in the fuel filling port structure is biased toward a closed position, and the lid is moved to an open position when a fuel filling nozzle is inserted.

BACKGROUND OF THE INVENTION

To speedily perform a fuel filling operation carried out in racing of motorcycles, in Japanese Patent Document JP-UM-A-3-27869, there has been known the fuel filling port structure of a fuel tank which operates a lid such that the lid is pushed downwardly to open a fuel filling port in response to a pushing manipulation of a fuel supply device to the fuel filing port and the lid closes the fuel filling port by simply removing the fuel supply device from the fuel filling port.

Here, the fuel filling port structure of a fuel tank disclosed in the above-mentioned Japanese Patent Document is configured such that the lid is biased by a spring toward a side that the fuel filling port is closed and hence, even when a pushing force acts on the lid due to an object other than the fuel supply device, the lid opens the fuel filling port.

The present invention has been made in view of the above-mentioned circumstances and it is an object of the present invention to provide a fuel filling port structure of a fuel tank which can prevent the opening of a fuel filling port due to an object other than a fuel supply device.

SUMMARY OF THE INVENTION

To achieve the above-mentioned object, the invention provides a fuel filling port in a fuel tank for receiving a fuel supply nozzle therein. The fuel filling port includes a port structure formed on the fuel tank for receiving fuel into the fuel tank, a lid disposed in the port structure and being movable between an open position and a closed position in response to insertion of the fuel supply nozzle, the lid being biased to the closed portion, and a plurality of lid locking mechanisms disposed in the port structure for locking the lid in the closed position when the fuel supply nozzle is not inserted, and for unlocking the lid when said fuel nozzle is inserted.

Further, a second characteristic of the invention resides in that the lid locking mechanisms are mounted on the fuel tank at a periphery of the port structure.

A third characteristic of the invention resides in that wherein the lid locking mechanisms include a rotary shaft, a cam fixed to a first end of the rotary shaft such that the cam is rotated when the fuel supply nozzle is inserted, and an engaging member fixed to a second end of the rotary shaft such that the engaging member is rotated when the cam is rotated, said rotation of the engaging member unlocking said lid.

A fourth characteristic of the invention resides in that a spring is disposed between the rotary shaft and the fuel tank in order to bias the rotary shaft to a position in which a portion of the cam projects towards a center of the port structure and in which the engaging member locks the lid.

Further, a fifth characteristic of the invention resides in that the lid locking mechanisms are mounted at three portions of a periphery of the port structure in an equidistantly spaced-apart manner in the circumferential direction.

According to the invention, when the manipulation to push the fuel supply device into the fuel filling port is performed, the lid is released from a closed position in which the lid is in locked by the lid locking mechanisms, and the fuel filling port can be opened by pushing down the lid. On the other hand, even when a pushing force is applied to the lid using an object other than the fuel supply device, the lid is held in the closed position by the lid locking mechanism and hence, there is no possibility that the lid is operated to open the fuel filling port. That is, the opening of the fuel filling port by an object other than the fuel supply device can be prevented.

Further, according to the invention, since the fuel supply devices are brought into contact with the lid locking mechanisms which are mounted on the fuel tank at three portions of the fuel filling port in an equidistantly spaced-apart manner in the circumferential direction, it is possible to support the fuel supply device in a stable manner at the time of performing the manipulation to push the fuel supply device into the fuel filling port.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
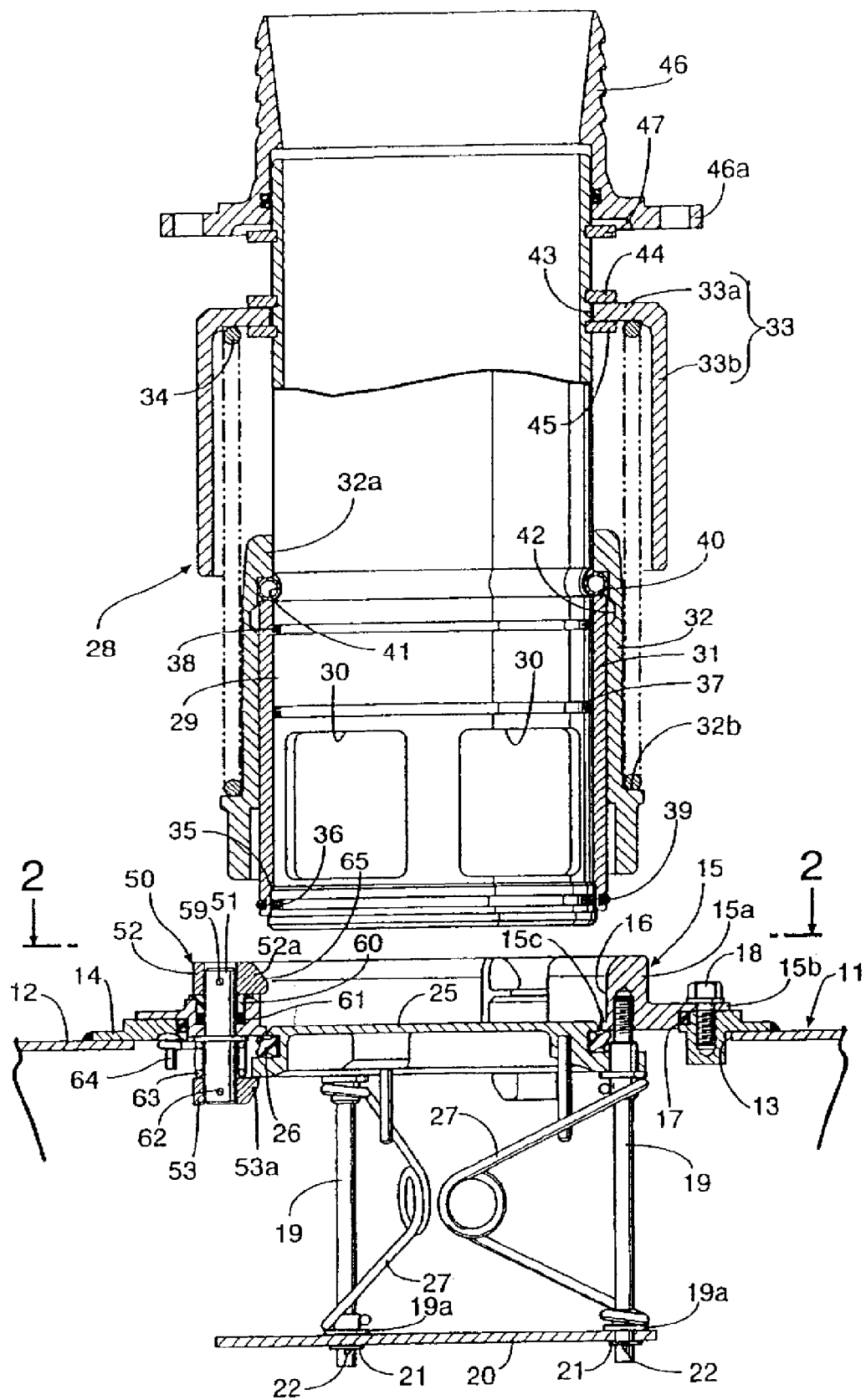
FIG. 1 is a longitudinal cross-sectional side view of a portion of a fuel tank and a fuel supply device according to the invention.
Figure 2:
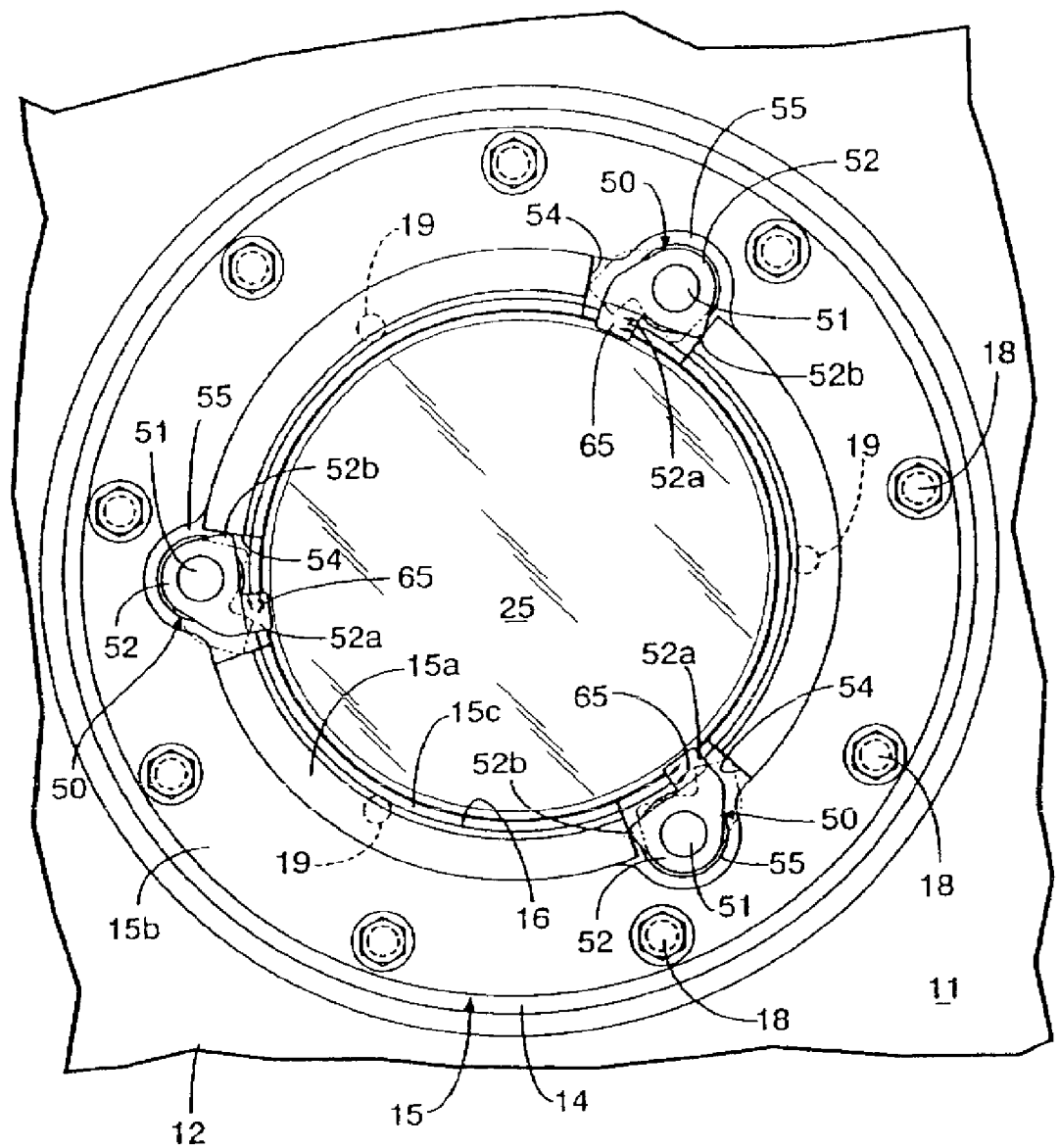
FIG. 2 is a plan view of the fuel tank taken from the direction of line 2-2 in FIG. 1.

First of all, in FIG. 1 and FIG. 2, a circular opening portion 13 is formed in an upper portion of a tank body 12 which constitutes a part of a fuel tank 11, a support ring 14 is connected to the tank body 12 by welding at a periphery of the opening portion 13, and a mouthpiece 15 is connected to the support ring 14 by fastening. The mouthpiece 15 is integrally formed of a cylindrical portion 15a which defines a fuel filling port 16 therein and a flange portion 15b which projects from a first end portion of the cylindrical portion 15a in the radially outward direction. The flange portion 15b which interposes an annular sealing member 17 between the support ring 14 and the flange portion 15b is connected to the support ring 14 using a plurality of bolts 18 by fastening.

At three positions which are arranged in an equidistantly spaced-apart manner in the circumferential direction of the cylindrical portion 15a of the mouthpiece 15, a second end portion of guide shafts 19, which extend in parallel to an axis of the cylindrical portion 15a, are threadedly engaged with the first end of the cylindrical portion 15a in a state that the first end of the cylindrical sleeve portion 15a extends into the inside of the tank body 12. Here, a disc-shaped restricting plate 20 is fixed to a first end of the guide shafts 19. Flange portions 19a, which are brought into contact with an upper surface of the restricting plate 20 are respectively integrally formed at the portion of guide shaft 19 which penetrates the restricting plate 20. Washers 21, which allow the guide shafts 19 to pass therethrough, are brought into contact with a lower surface of the restricting plate 20, and pins 22, which are engaged with washers 21 from below, respectively penetrate the guide shafts 19.

The fuel filling port 16 can be closed or opened by a lid 25 which is stored in the inside of the tank body 12. A ring-shaped annular projection 15c for closing the fuel filling port 16 by allowing an annular sealing member 26, which is mounted on an outer periphery of the lid 25 to be seated thereon, is integrally mounted on the mouthpiece 15 in a state that the annular projection 15c projects in the radially inward direction from an inner surface of the first end portion of the cylindrical portion 15a. The respective guide shafts 19 penetrate the lid 25. By guiding the lid 25 with the respective guide shafts 19, the lid 25 can be vertically moved between an upper position at which the lid 25 closes the fuel supply port 16 and a lower position at which the lid 25 is brought into contact with the restricting plate 20. Further, at portions corresponding to the respective guide shafts 19, which are arranged between the restricting plate 20 and the lid 25, return springs 27 are mounted which bias the lid 25 in the upward direction, that is, in the direction that the fuel filling port 16 is closed.

The lid 25 is operated to open the fuel filling port 16 by the pushing manipulation of the fuel supply device 28, which includes the fuel supply nozzle 29. The fuel supply device 28 includes the fuel supply nozzle 29, which is formed into a bottomed cylindrical shape having a first end thereof closed in a state that the closed end of the fuel supply nozzle 29 is brought into contact with the lid 25. The fuel supply nozzle 29 also has a side wall which is arranged close to the first end thereof, in which a plurality of valve holes 30 is formed. The fuel supply nozzle 29 also has a cylindrical valve sleeve 31 which allows the fuel supply nozzle 29 to fit therein in a slidable manner in a state that the fuel supply nozzle 29 can be slid relatively between a lower side closing position at which the respective valve holes 30 are closed and an upper side opening position at which the respective valve holes 30 are opened in the axial direction. The fuel supply nozzle 29 also has a cylindrical slider 32 which allows the valve sleeve 31 to fit therein in a slidable manner in a state that the valve sleeve 31 can be slid relatively in the axial direction. The fuel supply nozzle 29 also has a spring 34 which is provided in a shrinkable manner between a retainer 33 which is fixed to an upper portion of the fuel supply nozzle 29 and the slider 32.

An annular restricting stepped portion 35 which faces upwardly is formed on an outer periphery of the fuel supply nozzle 29 close to the first end of the fuel supply nozzle 29. By bringing the valve sleeve 31 into contact with the restricting stepped portion 35, a movable limit of the valve sleeve 31 in the downward direction from the lower-side closing position is restricted. Further, on an outer periphery of the first end portion of the fuel supply nozzle 29, an annular sealing member 36 is mounted, which is resiliently brought into contact with an inner periphery of the valve sleeve 31 arranged at the lower side closing position. On an outer periphery of an intermediate portion of the fuel supply nozzle 29, a pair of annular sealing members 37 and 38 is mounted in a spaced apart manner from each other. The annular sealing members 37 and 38 are resiliently brought into contact with an inner periphery of the valve sleeve 31 irrespective of an axially relative position thereof with respect to the fuel supply nozzle 29. Further, a first end of the valve sleeve 31 can be brought into contact with the annular projection 15c of the fuel filling port 16 when the valve sleeve 31 is inserted into the inside of the fuel filling port 16. An annular sealing member 39, which is resiliently brought into contact with the inner periphery of the fuel filling port 16, is mounted on an outer periphery of the first end portion of the valve sleeve 31.

A first annular recessed portion 41 is formed in an outer periphery of the intermediate portion of the fuel supply nozzle 29. The first annular recessed portion 41 stores approximately half of a coil spring 40, which is formed into an annular shape so as to be brought into contact with a second end of the valve sleeve 31 arranged at the lower side closing position. Further, the valve sleeve 31 has a thickness corresponding to a projection quantity of the coil spring 40 in the radially outward direction from the fuel supply nozzle 29 in a state that approximately half of the coil spring 40 is stored in the first annular recessed portion 41. On a second end of the slider 32 which allows the valve sleeve 31 to fit therein in an axially and relatively slidable manner, an inward flange portion 32a is integrally formed in a state that the inward flange portion 32a projects in the radially inward direction. The inward flange portion 32a can be brought into contact with a portion of the coil spring 40 projected from the first annular recessed portion 41 from above.

Further, on an inner surface of the slider 32, which is arranged closed to the second end of the slider 32, a second annular recessed portion 42 is formed. The second annular recessed portion 42 stores an approximately half of the fuel supply nozzle 29 when the coil spring 40, which is brought into contact with the second end of the valve sleeve 31 in moving the valve sleeve 31 to the upper side opening position with respect to the fuel supply nozzle 29, is removed from the first annular recessed portion 41 toward an outer periphery of the fuel supply nozzle 29.

The retainer 33 is integrally formed of a disc portion 33a, having a through hole 43 which allows the fuel supply nozzle 29 to penetrate therethrough in a center portion thereof, and a cylindrical portion 33b, which is contiguously connected with an outer periphery of the disc portion 33a at a right angle and extends toward the tank body 12 side. By mounting a pair of retainer rings 44 and 45, which sandwich the disc portion 33a from both sides at a periphery of the through hole 43 on an outer periphery of the fuel supply nozzle 29, the retainer 33 is fixed to the fuel supply nozzle 29. The spring 34 is formed in a coil shape and surrounds the fuel supply nozzle 29 and the slider 32. The spring 34 is arranged in a shrinkable manner between an annular receiving stepped portion 32b, which is formed on an outer periphery of the slider 32 while facing the retainer 33 side, and the disc portion 33a of the retainer 33.

On a second end portion of the fuel supply nozzle 29, a connection member 46 to which a fuel hose not shown in the drawing is connected, is hermetically fitted. On the connection member 46, a flange portion 46a, which is provided for applying a force to push the fuel supply nozzle 29 into the fuel filling port 16, is integrally formed in a state that the flange portion 46a projects outwardly in the radial direction. A retainer ring 47, which is capable of coming into contact with a first end of the connection member 46, is mounted on an outer periphery of the fuel supply nozzle 29 for transmitting an external force applied to the flange portion 46a to the fuel supply nozzle 29 from the connection member 46.

Here, when the manipulation to push the fuel supply device 28, which includes the fuel supply nozzle 29, is not performed, although the fuel supply device 28 is engaged with the lid 25 at the closed position, the lid 25 is held in the closed position. Lid locking mechanisms 50, which allow an operation of the lid 25 to move to the open position side in response to the pushing manipulation of the fuel supply device 28, are provided to the fuel tank 11. The lid locking mechanisms 50 are mounted on three portions of the fuel tank 11 and are spaced apart equidistantly in the circumferential direction of the fuel filling port 16 at the periphery of the fuel filling port 16.

Figure 3:
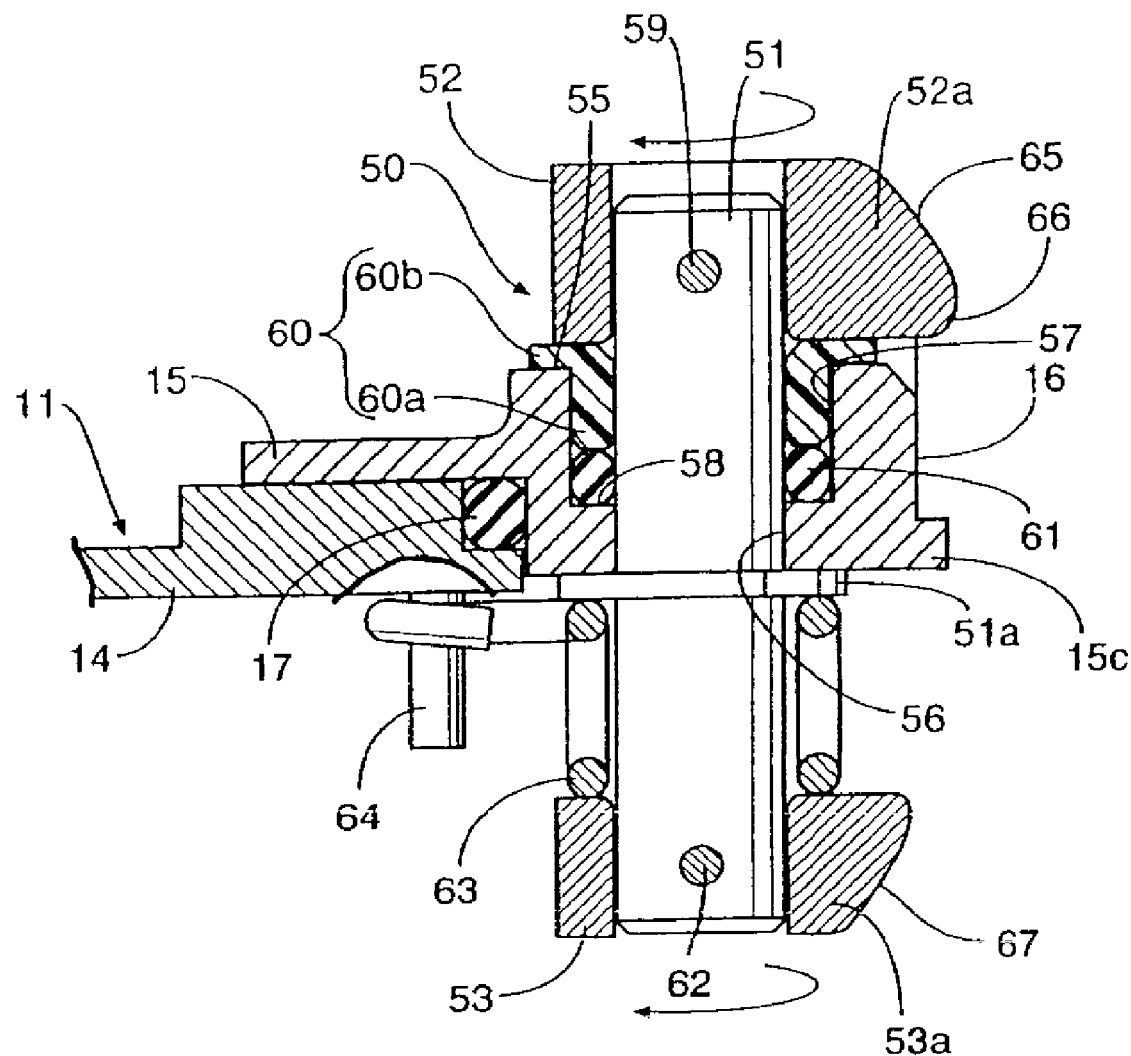
FIG. 3 is an enlarged longitudinal cross-sectional view of a lid locking mechanism according to the invention.

To explain also in conjunction with FIG. 2 and FIG. 3, each lid locking mechanism 50 includes a rotary shaft 51, which is rotatably supported on the mouthpiece 15 of the fuel tank 11. Each lid locking mechanism also includes a cam 52, which is fixed to a first end of the rotary shaft 51 in a state that the cam 52 is rotated while being in contact with the fuel supply device 28 in response to the pushing manipulation of the fuel supply device 28. Each lid locking mechanism also includes an engaging member 53, which is fixed to a second end of the rotary shaft 51 in a state that the engaging member 53 is rotated toward a side which releases the engagement of the engaging member 53 with the lid 25 in response to the rotation of the cam 52 corresponding to the pushing manipulation of the fuel supply device 28.

Here, at three center portions between three guide shafts 19, notched portions 54, which are opened at a second end side of the cylindrical portion 15a, are formed in the cylindrical portion 15a. Planar support surfaces 55, which face the outside, are formed of closed ends of the notched portions 54. Portions which are formed by raising portions of the flange portion 15b become coplanar with the closed ends. Further, at positions corresponding to a contiguously connecting portion between the cylindrical portion 15a and the flange portion 15b, small-diameter holes 56, which have a first end thereof opened in the inside of the tank body 12, are formed. Additionally, at positions corresponding to a contiguously connecting portion between the cylindrical portion 15a and the flange portion 15b, large diameter holes 57 are formed, which have first ends thereof coaxially communicated with second ends of the small-diameter holes 56, and have second ends thereof opened in the support surface 55. Annular stepped portions 58, which face the outside, are formed between the second ends of the small-diameter holes 56 and the first ends of the large-diameter holes 57 having a larger diameter than the small diameter holes 56.

In the small-diameter hole 56, the rotary shaft 51 having a flange portion 51a, which is brought into contact with a first end of the mouthpiece 15, is rotatably inserted. The cam 52 is fixed to a projecting end of the rotary shaft 51, which projects from the support surface 55 by a pin 59, for example. Further, between the rotary shaft 51 and the cam 52 and the mouthpiece 15, a bearing member 60 which makes the rotation of the rotary shaft 51 smooth is interposed. The bearing member 60 includes a cylindrical portion 60a, which is inserted in a gap defined between the rotary shaft 51 and the large diameter hole 57, and a flange portion 60b, which is integrally and contiguously formed with the cylindrical portion 60a in a state that the flange portion 60b is interposed between the cam 52 and the support surface 55. An annular sealing member 61 which coaxially surrounds the rotary shaft 51 is sandwiched between a first end of the cylindrical portion 60a and the stepped portion 58.

The cam 52 is integrally formed of a contact projection 52a, which has a distal end thereof projected into the inside of the fuel filling port 16, and a restricting projection 52b, which is arranged about an axis of the rotary shaft 51 at a position offset from the contact projection 52a. The cam 52 is rotatable between a projection position indicated by a solid line in FIG. 2, at which the restricting projection 52b is brought into contact with a first end side of the notched portion 54 along the circumferential direction of the mouthpiece 15 so as to project a distal end of the contact projection 52a into the inside of the fuel filling port 16, and a retracting position indicated by a chained line shown in FIG. 2, at which the contact projection 52a is brought into contact with a second end side of the notched portion 54 along the circumferential direction of the mouthpiece 15 so as to retract the contact projection 52a to the outside of the fuel filling port 16.

Further, the engaging member 53 integrally includes an engaging projection 53a which is brought into contact with and also is engaged with an inner surface of an outer peripheral portion of the lid 25, which assumes a position at which the fuel filling port 16 is closed as shown in FIG. 1. The engaging member 53 is fixed to the second end of the rotary shaft 51 using a pin 62, for example. The engaging member 53 is fixed to the rotary shaft 51 such that when the cam 52 is at a projecting position, it assumes a rotary position at which the engaging projection 53a is brought into contact with and also is engaged with the lid 25. When the cam 52 is at a retracting position, the engaging portion assumes a rotary position at which the engagement of the engaging projection 53a with the lid 25 is released.

Further, between the rotary shaft 51 and the fuel tank 11, a spring 63 is provided which allows a distal end of the contact projection 52a which forms a portion of the cam 52, to project into the inside of the fuel filling port 16 and, at the same time, which resiliently biases the rotary shaft 51 to a side at which the engaging projection 53a, which forms a portion of the engaging member 53, is engaged with the lid 25. The spring 63 is a torsion spring which surrounds the rotary shaft 51 between the flange portion 51a of the rotary shaft 51 and the engaging member 53. The spring 63 has a first end thereof engaged and connected with the engaging member 53, and a second end of the spring 63 is engaged and connected with a pin 64 which is mounted on the support ring 14.

Here, in a state that the cam 52 allows the distal end of the contact projection 52a to project into the inside of the fuel filling port 16 and, at the same time, the engaging member 53 is at a position where engaging member 53 allows the engaging projection 53a to be engaged with the lid 25 at a closed position, when the fuel supply device 28 is pushed into the inside of the fuel filling port 16, the first end of the valve sleeve 31 in the fuel supply device 28 is brought into contact with an inclined surface 65 formed on an upper surface of the distal end of the contact projection 52a. The inclined surface 65 is inclined such that the inclined surface 65 assumes an upper position along with the progress of the inclined surface 65 in the clockwise direction shown in FIG. 2 about an axis of the rotary shaft 51. Corresponding to the application of a pushing force to the inclined surface 65 of the contact projection 52a from the first end of the valve sleeve 31, a force which rotates the cam 52 toward the retracting position is applied to the cam 52 and the rotary shaft 51 and hence, due to the rotation of the rotary shaft 51, the engaging member 53 is also rotated to a side at which the engagement of the engaging projection 53a with the lid 25 is released.

Further, on a lower surface of a distal end portion of the contact projection 52a, a curved surface 66 is formed for preventing, in removing the fuel supply device 28 from the fuel filling port 16, a portion of the fuel supply device 28 from being engaged with the contact projection 52a even when the portion of the fuel supply device 28 is brought into contact with the contact projection 52a from below. On a lower surface of a distal end portion of the engaging projection 53a in the engaging member 53, a curved surface 67 is formed for preventing, in removing the fuel supply device 28 from the fuel filling port 16, a portion of the fuel supply device 28 from being engaged with the engaging projection 53a even when the portion of the fuel supply device 28 is brought into contact with the engaging projection 53a from below.

Figure 4:
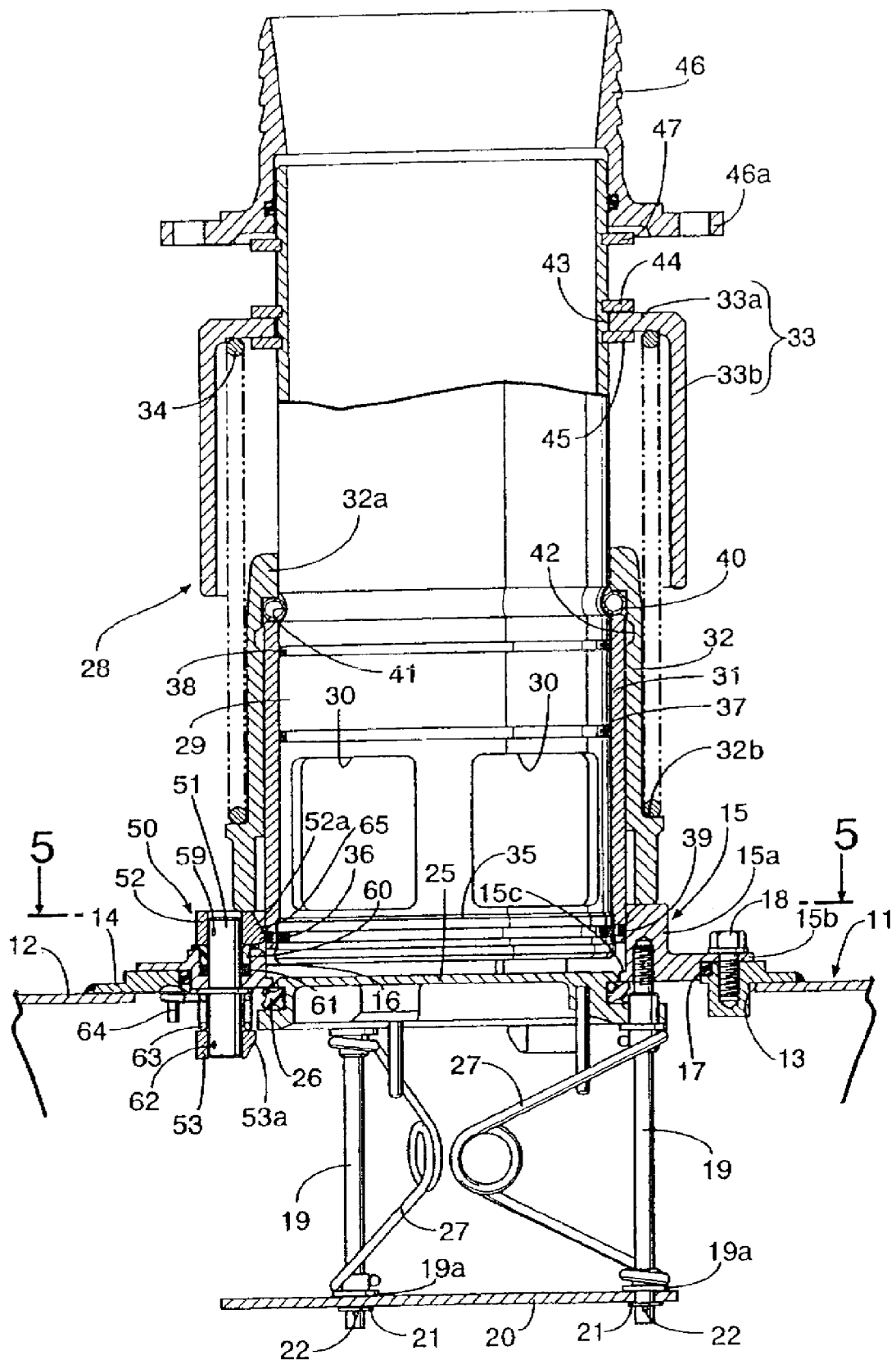
FIG. 4 is a longitudinal cross-sectional side view corresponding to FIG. 1 in a state that a fuel supply device is inserted into a fuel filling port according to the invention.
Figure 5:
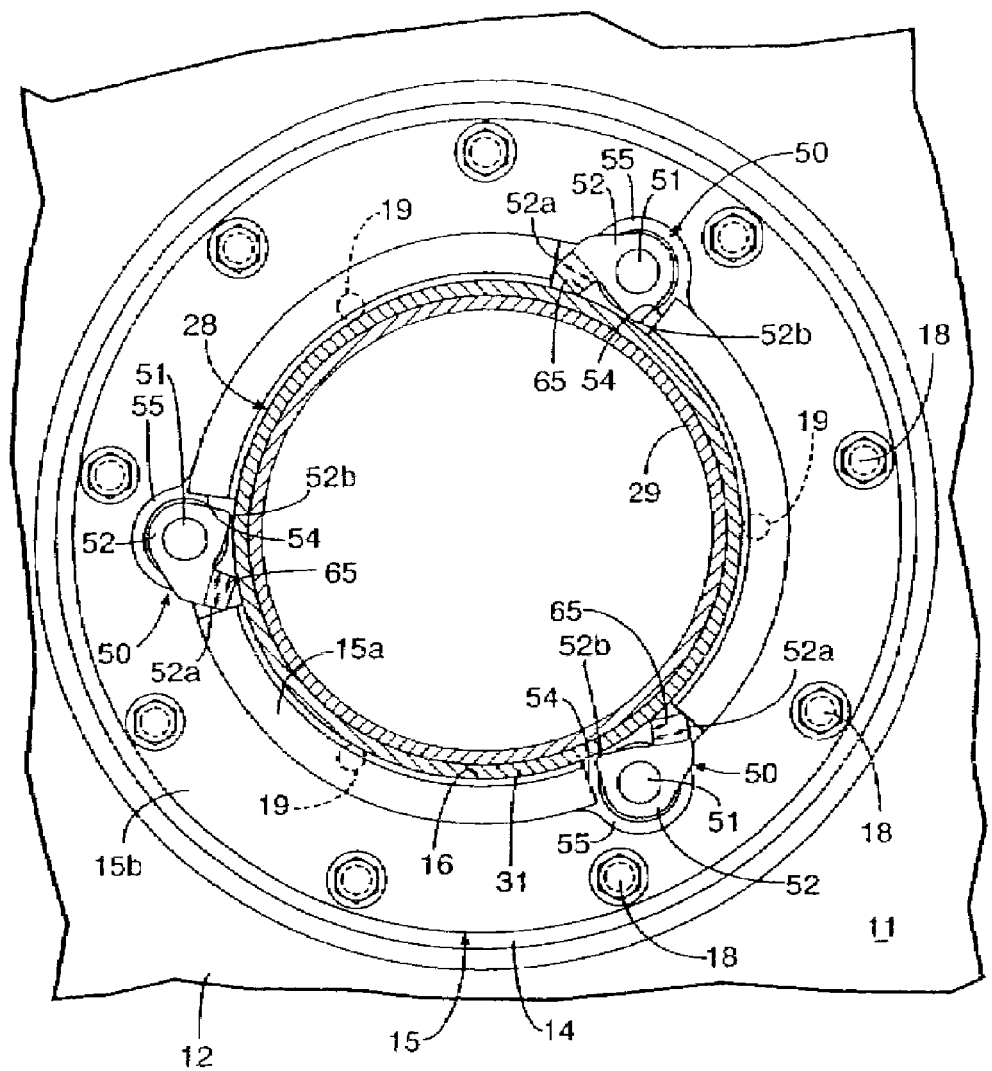
FIG. 5 is a cross-sectional view taken along line 5-5 in FIG. 4.
Figure 6:
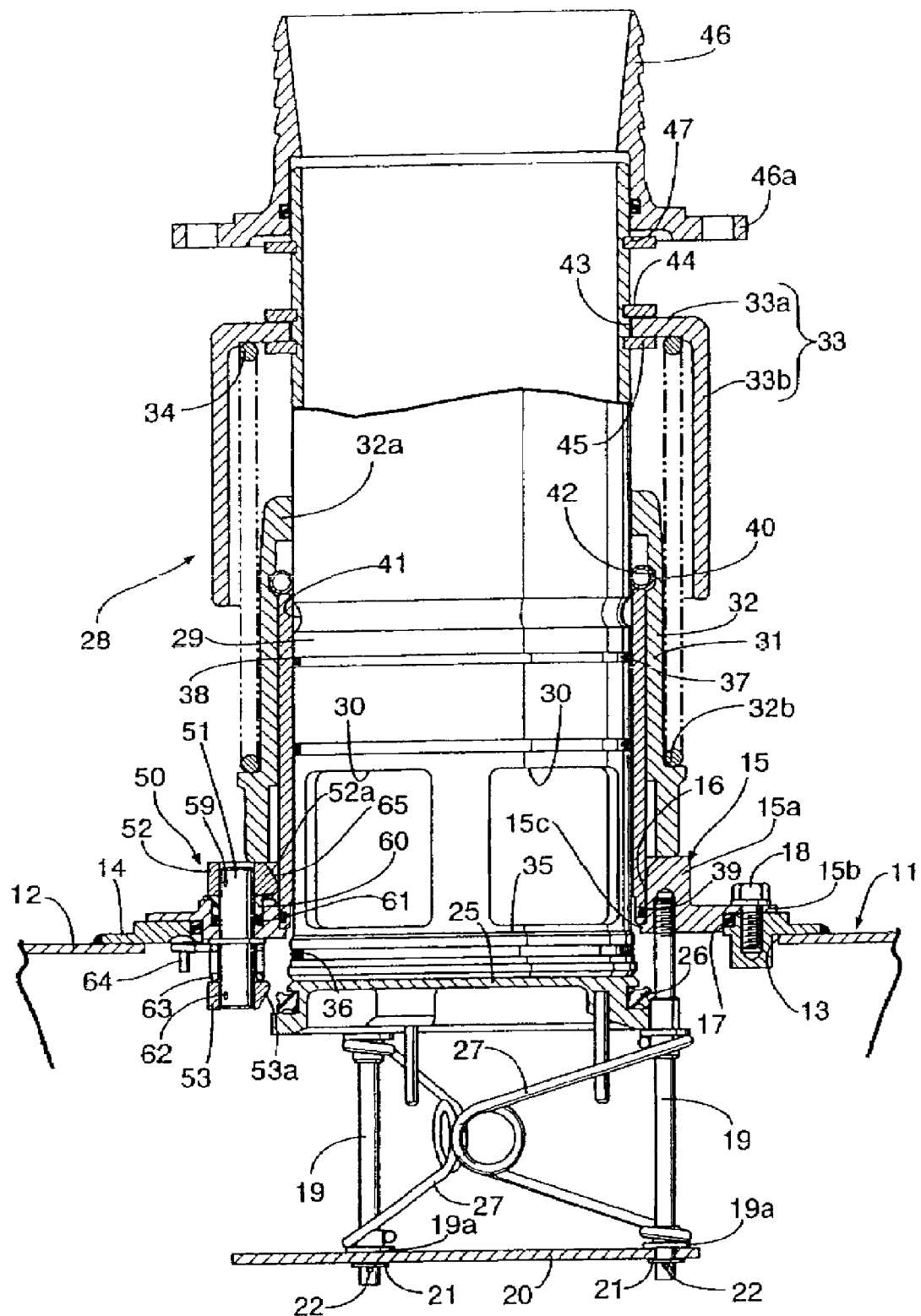
FIG. 6 is a longitudinal cross-sectional side view corresponding to FIG. 1 in a state that the fuel supply device is further inserted into the fuel filling port from a state of FIG. 4.

In such lid locking mechanisms 50, when the fuel supply device 28 is inserted into the fuel filling port 16 of the fuel tank 11, the first end of the valve sleeve 31 in the fuel supply device 28 is brought into contact with the inclined surfaces 65 formed on the distal ends of the contact projections 52a in the respective cams 52. Accordingly, as shown in FIG. 4 and FIG. 5, when the fuel supply device 28 is pushed downwardly until a first end of the slider 32 is brought into contact with the outer end of the mouthpiece 15, the cams 52 are rotated to the retracting position and hence, the engaging member 53 is rotated to the position at which the engagement of the engaging member 53 with the lid 25 is released. When a pushing force downwardly in the axial direction is applied to the fuel supply nozzle 29 of the fuel supply device 28, as shown in FIG. 6, it is possible to push down the valve sleeve 31 until the valve sleeve 31 is brought into contact with the annular projection 15c in the inside of the fuel filling port 16 along with the shrinkage of the spring 34 while holding the slider 32 in a contact state with the mouthpiece 15. In this case, corresponding to the relative movement of the valve sleeve 31 in the axial direction with respect to the slider 32, the coil spring 40, which has approximately half thereof housed in the first annular recessed portion 41 is moved to a position at which approximately half of the coil spring 40 can be housed in the second annular recessed portion 42. By further pushing down the fuel supply nozzle 29, the coil spring 40 is removed from the first annular recessed portion 41 and assumes a state in which approximately half of the coil spring 40 is housed in the second annular recessed portion 42 while being in slidable contact with an outer periphery of the fuel supply nozzle 29.

Figure 7:
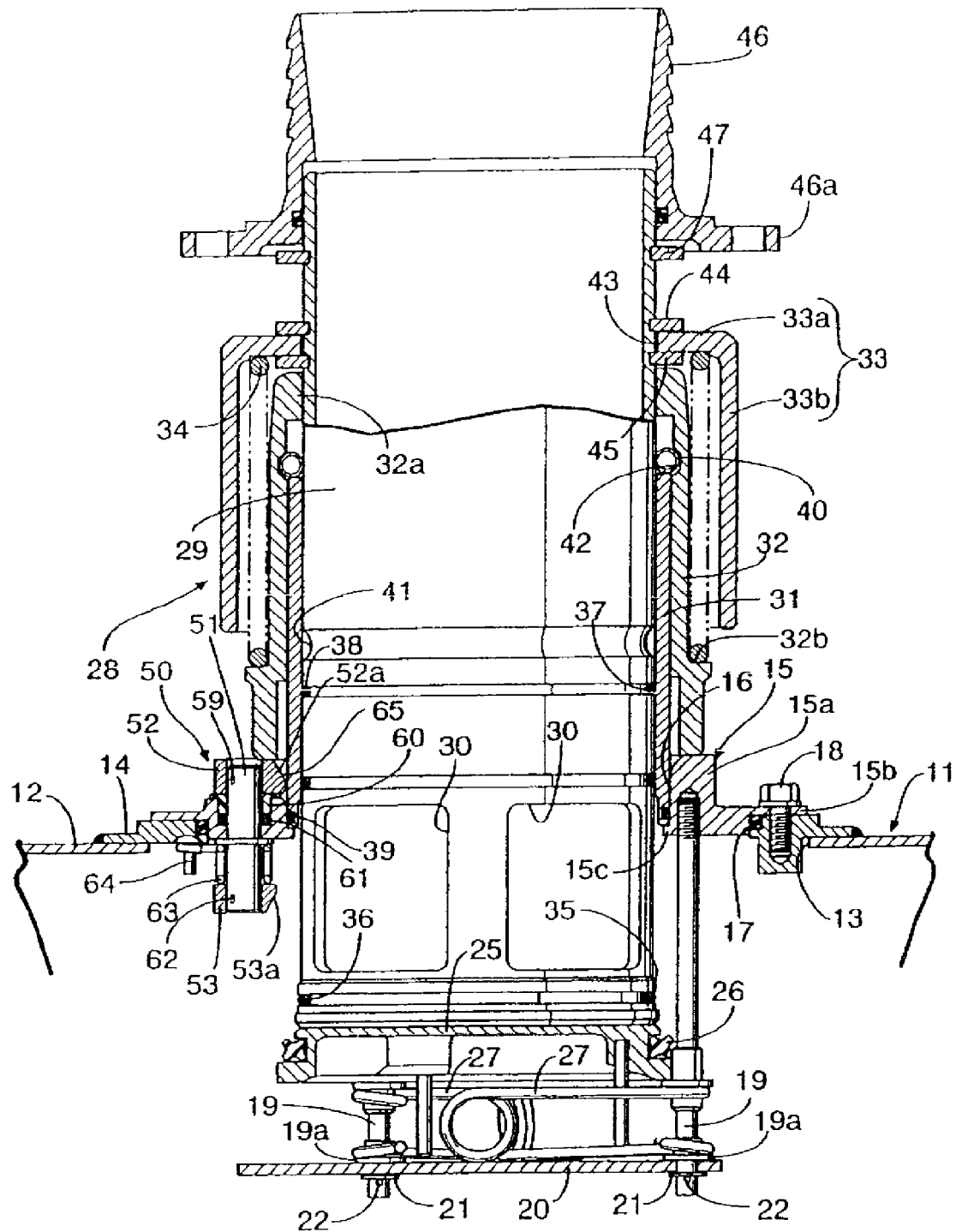
FIG. 7 is a longitudinal cross-sectional side view corresponding to FIG. 1 in a state that the fuel supply device is inserted into a deepest position of the fuel filling port according to the invention.

When the fuel supply nozzle 29 is further pushed down, as shown in FIG. 7, the first end of the fuel supply nozzles 29 projects into the inside of the fuel tank 11, and the valve sleeve 31 is moved relatively to the upper open position with respect to the fuel supply nozzle 29 and hence, the valve holes 30 at the first end portion of the fuel supply nozzle 29 are opened, whereby fuel flows into the inside of the fuel tank 11 through the respective valve holes 30 of the fuel supply nozzles 29.

The lid locking mechanisms 50, which allows the operation of the lids 25 to the open position side corresponding to the pushing manipulation of the fuel supply device 28 while holding the lids 25 at the closed position by being engaged with the lid 25 at the closed position when the manipulation to push the fuel supply device 28 is not performed, are provided to the fuel tank 11 at the peripheries of the fuel filling ports 16. When the manipulation to push the fuel supply device 28 into the fuel filling port 16 is performed, the closed position locking state of the lid 25 is released by the lid locking mechanisms 50 and the fuel filling ports 16 can be opened by pushing down the lid 25. On the other hand, even when a pushing force is applied to the lid 25 using an object other than the fuel supply device 28, the closed position of the lid 25 is held by the lid locking mechanisms 50 and hence, there is no possibility that the lid 25 is operated to open the fuel filling ports 16. That is, opening of the fuel filling ports 16 by objects other than the fuel supply device 28 can be prevented.

Further, since the lid locking mechanisms 50 are provided to the fuel tank 11 at three portions which are arranged equidistantly in the circumferential direction of the fuel filling port 16 and hence, three portions of the fuel supply device 28 which are equidistantly arranged in the circumferential direction are brought into contact with the lid locking mechanisms 50. Thus, it is possible to stably support the fuel supply device 28 at the time of performing the manipulation to push the fuel supply device 28 into the fuel filling port 16.

Although the embodiments of the present invention have been explained heretofore, the present invention is not limited to the above-mentioned embodiments and various modifications in design can be performed without departing from the gist of the present invention described in claims.

We claim:

1. A fuel filling port in a fuel tank, for receiving a fuel supply nozzle therein, comprising:
    a port structure formed on the fuel tank for receiving fuel into the fuel tank;
    a lid disposed in said port structure and being movable between an open position and a closed position in response to insertion of said fuel supply nozzle, said lid being biased to the closed portion; and
    a plurality of lid locking mechanisms disposed in said port structure for locking said lid in the closed position when said fuel supply nozzle is not inserted, and for unlocking said lid when said fuel nozzle is inserted,
    wherein each of said lid locking mechanisms comprises:
        a rotary shaft,
        a cam fixed to a first end of the rotary shaft such that the cam is rotated when said fuel supply nozzle is inserted, and
        an engaging member fixed to a second end of the rotary shaft such that the engaging member is rotated when said cam is rotated, said rotation of said engaging member unlocking said lid.

2. The fuel filling port structure according to claim 1, wherein the lid locking mechanisms are mounted on the fuel tank at a periphery of the port structure.

3. The fuel filling port structure according to claim 2, wherein a spring is disposed between the rotary shaft and the fuel tank in order to bias the rotary shaft to a position in which a portion of the cam projects towards a center of said port structure and in which the engaging member locks the lid.

4. The fuel filling port structure according to claim 2, wherein said lid locking mechanisms are mounted at three positions of a periphery of the port structure in an equidistantly spaced-apart manner in the circumferential direction.

* * * * *